(12) United States Patent
Jotanotivc (10) Patent No.: US 8,688,290 B2
(45) Date of Patent: Apr. 1, 2014

(54) PREDICTIVE DESTINATION ENTRY FOR A NAVIGATION SYSTEM

(75) Inventor: Mark A. Jotanotivc, Troy, MI (US)

(73) Assignee: Toyota Motor Enginerring & Manufacturing North America, Inc., Erlanger, KY (US)

( * ) Notice: Subject to any disclaimer, the term of this patent is extended or adjusted under 35 U.S.C. 154(b) by 40 days.

(21) Appl. No.: 13/338,139

(22) Filed: Dec. 27, 2011

(65) Prior Publication Data

US 2013/0166096 A1    Jun. 27, 2013

(51) Int. Cl.
*G01C 21/00*    (2006.01)
(52) U.S. Cl.
USPC .............................................. 701/1; 701/408
(58) Field of Classification Search
USPC ......... 701/1, 468, 29.1, 439, 423; 340/995.19
See application file for complete search history.

(56) References Cited

U.S. PATENT DOCUMENTS

| | | | |
|---|---|---|---|
| 6,411,893 B2 | 6/2002 | Ruhl | |
| 6,611,754 B2 | 8/2003 | Klein | |
| 6,892,135 B1 | 5/2005 | Krull et al. | |
| 7,269,504 B2 | 9/2007 | Gardner et al. | |
| 7,822,546 B2 | 10/2010 | Lee | |
| 2005/0102098 A1 | 5/2005 | Montealegre et al. | |
| 2005/0125148 A1* | 6/2005 | Van Buer et al. | 701/209 |
| 2006/0262103 A1* | 11/2006 | Hu et al. | 345/173 |
| 2006/0265122 A1 | 11/2006 | Chang et al. | |
| 2007/0073477 A1* | 3/2007 | Krumm et al. | 701/209 |
| 2008/0167820 A1 | 7/2008 | Oguchi et al. | |
| 2008/0262667 A1* | 10/2008 | Otabe | 701/22 |
| 2009/0192705 A1 | 7/2009 | Golding et al. | |
| 2009/0248285 A1 | 10/2009 | Bauer | |
| 2009/0312946 A1* | 12/2009 | Yoshioka et al. | 701/208 |
| 2009/0319176 A1* | 12/2009 | Kudoh et al. | 701/207 |
| 2010/0007463 A1* | 1/2010 | Dingman et al. | 340/5.72 |
| 2010/0036601 A1* | 2/2010 | Ozawa et al. | 701/201 |
| 2010/0198508 A1 | 8/2010 | Tang | |
| 2010/0211304 A1 | 8/2010 | Hwang et al. | |
| 2011/0106434 A1* | 5/2011 | Ishihara | 701/202 |
| 2011/0238289 A1* | 9/2011 | Lehmann et al. | 701/201 |
| 2011/0319094 A1* | 12/2011 | Usui et al. | 455/456.1 |
| 2012/0066007 A1* | 3/2012 | Ferrick et al. | 705/4 |
| 2012/0158289 A1* | 6/2012 | Bernheim Brush et al. | 701/425 |
| 2012/0191289 A1* | 7/2012 | Guo et al. | 701/29.1 |
| 2012/0253568 A1* | 10/2012 | Uyeki | 701/22 |
| 2013/0066548 A1* | 3/2013 | Gruen et al. | 701/410 |

FOREIGN PATENT DOCUMENTS

| | | |
|---|---|---|
| DE | 102008044784 | 3/2010 |
| JP | 2003185452 | 7/2003 |
| JP | 2006189326 | 7/2006 |

\* cited by examiner

*Primary Examiner* — Marthe Marc-Coleman
(74) *Attorney, Agent, or Firm* — Snell & Wilmer LLP (57) ABSTRACT

A predictive destination entry system for a vehicle navigation system to aid in obtaining a destination for the vehicle. The navigation system utilizes a memory for storing data relating to prior driving history or habits. A processor connected with the memory examines the information stored in the memory for making predictions for the current destination desired by a user of the vehicle. The information stored in the memory may be segregated into distinct user profiles and may include the vehicle location, previous driving history of the vehicle, previous searching history of a user of the vehicle, or sensory input relating to one or more characteristics of the vehicle. The navigation system may either confirm the predicted destination with the user of the vehicle before generating or displaying a travel route to the predicted destination or may automatically generate and display the travel route without verifying the destination with the user.

24 Claims, 6 Drawing Sheets

PREDICTIVE DESTINATION ENTRY FOR A NAVIGATION SYSTEM

BACKGROUND

1. Field

The present invention relates generally to improvements in vehicle navigation destination entry and more particularly pertains to predictive navigation destination entry using historical data or sensory input.

2. Description of the Related Art

Navigation systems for use with automobiles or other vehicles have become increasingly popular among consumers due to the convenience with which they allow for travel through unfamiliar areas or to unfamiliar destinations. Paper maps, once a common supplement for lengthy automobile trips, are increasingly being replaced by electronic navigation systems. Such systems provide numerous benefits over paper maps. For example, paper maps require a user to re-purchase new paper maps regularly in order to remain informed of the latest road changes or developments. Failure to do so can result in confusion or anxiety when a user attempts to follow the directions provided by an outdated and incorrect map. Moreover, paper maps do not provide the user with exact, easy-to-follow instructions, but rather only provide a layout of roads and cities, leaving the actual navigation up to the user of the map. Such a system has often caused stress for users before embarking to a travel destination that is unfamiliar. Electronic navigation systems significantly alleviate these concerns since the electronically stored maps can be easily updated, often automatically or transparently as far as the user in concerned. Furthermore, electronic navigation systems are able to provide additional turn-by-turn instructions that paper maps cannot by accurately pinpointing the current location of the vehicle and relaying to the user the precise turns and distances that must be traveled to arrive at a desired destination.

Constructed initially as standalone, portable or handheld units, automobile and other vehicle manufacturers have increasingly begun included such electronic navigation systems into the interior of the vehicle. Oftentimes, these systems are incorporated as part of the stereo or other dashboard media system so as to provide easy access to the driver or front-seat passenger of the vehicle. No longer must a driver remember to separately charge the battery and bring a portable navigation device into the vehicle for long trips, but rather may simply turn on the vehicle and access the navigation system upon embarking. Electronic navigation systems are typically capable of tracking the worldwide position of the vehicle and may display that position on a viewable map, with or without travel routes highlighted and driving instructions provided.

Unfortunately, the inclusion of navigation systems inside vehicles has not been without problems. Significantly, current navigation systems rely upon the driver or other occupier or user of the vehicle to manually input their desired destination before the navigation system can accurately direct the vehicle. This issue is further compounded if the driver is unsure of the specific destination address and is only aware more generally of the broad area they wish to travel. Thus, drivers must often enter what may be a long or detailed destination address into the navigation system using its input system. The input system is commonly a mechanical keypad, a series of knobs and/or buttons or a touch-screen interface that the driver manipulates with their fingers to appropriately input their desired destination. Doing so is time-consuming and bothersome to drivers, particularly when the desired address encompasses a lengthy string of characters or numerals. While certain systems employ voice recognition software to aid the user in entering the destination via spoken voice, the driver is still inconvenienced by having to focus their time and attention on the manual input.

Manual destination entry also poses disadvantages when the driver must divert their attention to the electronics within the vehicle instead of focusing their awareness upon the surrounding environment outside of the vehicle. This can become a problem when a driver must enter or update the desired destination of the navigation system after the vehicle is already on the road and not sitting in a stationary location away from any potential traffic. A navigation system that allows for a driver to substantially keep their hands on the steering wheel and/or the gear shift of the vehicle instead of manually operating and entering destination addresses to the navigation system would be advantageous. A quicker or more efficient manner of setting or obtaining a destination in a vehicle's navigation system is thus desired, particularly one that could predict a destination for the driver without requesting substantial driver effort or concentration in the establishment of such a destination setting.

SUMMARY

The present invention may provide various improvements over current vehicle navigation systems. The present invention examines driving habits, either for a particular driver or for the vehicle in general to predict a desired destination for the vehicle and may utilize the current vehicle location or the current time, day, or date to aid in the prediction. For example, the present invention may provide a vehicle navigation system that examines a previous driving history of the vehicle for predicting a desired current destination for the vehicle. Moreover, the present invention may also provide a vehicle navigation system that examines a previous searching history of a user of the vehicle for predicting a current destination for the vehicle. Furthermore, the present invention may also provide a vehicle navigation system that examines a sensor that senses a characteristic of a vehicle for predicting a current destination for the vehicle.

In one embodiment, the present invention may provide a navigation system for a vehicle including a memory for storing data and a display coupled with the vehicle. A processor is coupled with the display and with the memory, the processor configured to predict a destination for the vehicle based upon the data stored in the memory.

In another embodiment, the present invention may provide a method for predicting a destination for a vehicle, the method providing a navigation system having a display, a processor coupled with the display, and a memory coupled with the processor. The method may further include storing in the memory a prior destination for the vehicle, determining a current location of the vehicle using the processor, and predicting a current destination for the vehicle using the processor based on the prior destination for the vehicle stored in the memory.

In yet another embodiment, the present invention may provide a method for predicting a destination for a vehicle, the method providing a navigation system having a display, a processor coupled with the display, and a memory coupled with the processor. The method may include providing a sensor coupled to the vehicle and communicating with the processor. The method may further include determining a current location of the vehicle using the processor, sensing a characteristic of the vehicle using the sensor, and predicting a current destination for the vehicle using the processor based on the characteristic of the vehicle sensed by the sensor.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1A:
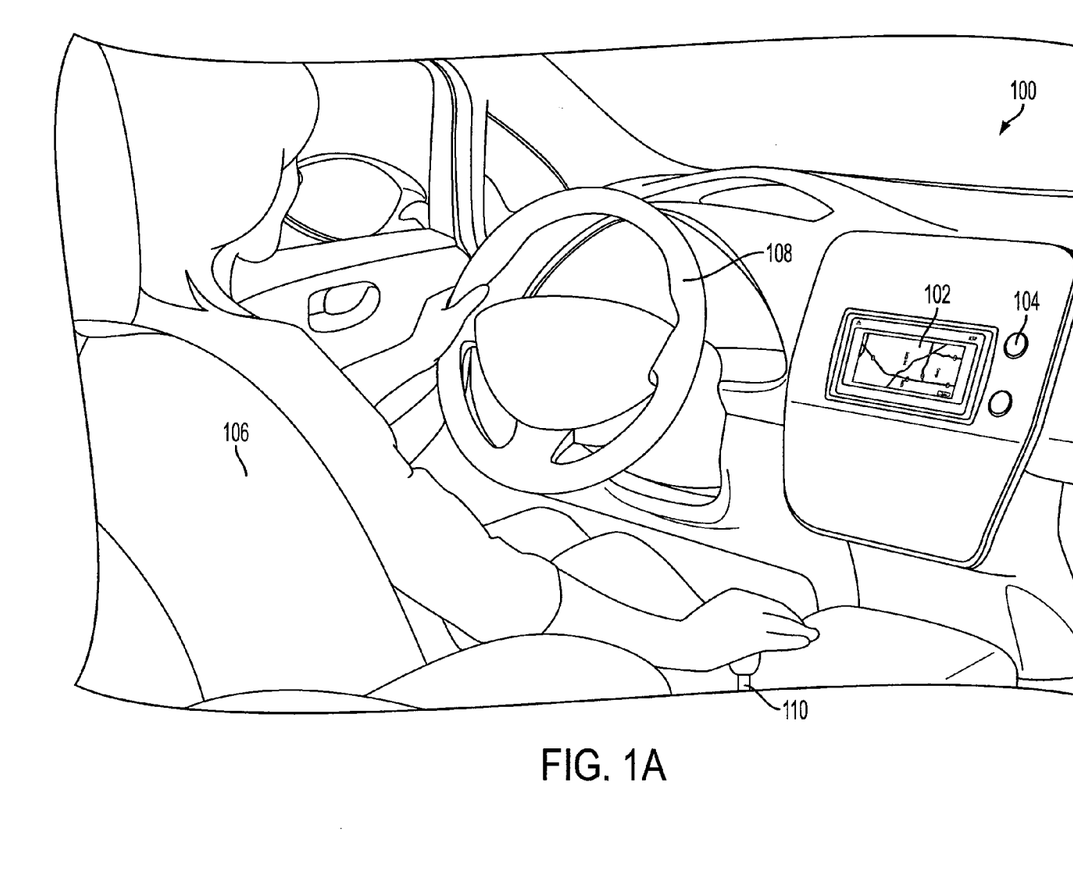
FIG. 1A is a perspective view of an interior of a vehicle having a navigation system.
Figure 1B:
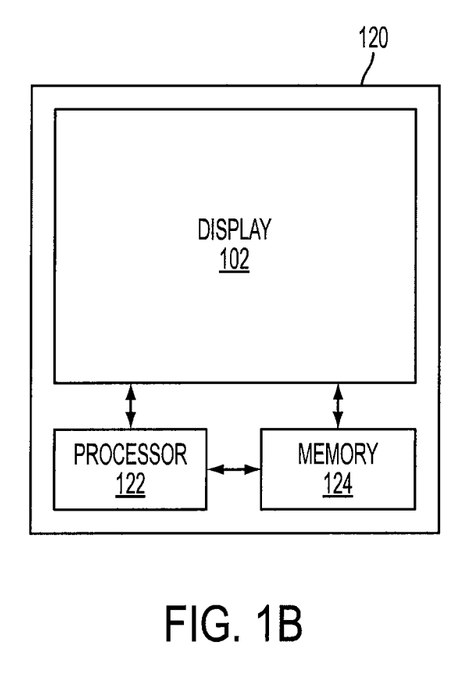
FIG. 1B is a simplified block diagram of a navigation system having a display, a processor coupled with the display, and a memory coupled with the processor according to an embodiment of the present invention.

Referring to FIG. 1A, the interior 100 of a vehicle is shown and includes a driver seat 106, a steering wheel 108, and a gear shift 110. FIG. 1B is a simplified block diagram of a navigation system 120 having a display 102, a processor 122 coupled with the display 102, and a memory 124 coupled with the processor 122 and/or the display 102. Referring to FIGS. 1A and 1B, the navigation system 120 includes the display 102 and inputs or controls 104, which may be included as part of the center dash or console of the interior 100. The navigation system 120 allows for a user of the vehicle to access maps and/or travel routes or instructions while driving or otherwise seated in the driver seat 106 or the interior 100 of the vehicle. For example, the display 102 of the navigation system 120 may be configured to display a map of the surrounding roadways or environment and be configured to provide a highlighted travel route for the vehicle to move from a current destination to a desired destination.

The display 102 and associated inputs or controls 104 are conveniently placed within an easily viewable and accessible area of the interior 100, such as the center of the dashboard, to facilitate comfortable access by a user of the vehicle to the various functions and/or features of the navigation system 120. A positioning system, such as GPS, is also included as part of the navigation system 120 for determining the current location of the vehicle. The map displayed on the display 102 may be centered on this current location of the vehicle. The inputs or controls 104 may be used for manually inputting a desired destination to the navigation system 120 or for navigating or adjusting other features or functions of the navigation system 120. A driver of the vehicle seated in the driver seat 106 will have to remove one of their hands from either the steering wheel 108 or the gear shifter 110 in order to manually operate the inputs or controls 104 of the navigation system 120. By utilizing a navigation system 120 having predictive destination entry, as discussed in greater detail herein, a user of the vehicle may no longer need to manually input or operate the inputs or controls 104 of the navigation system 120 to set a destination for the navigation system 120.

Figure 2:
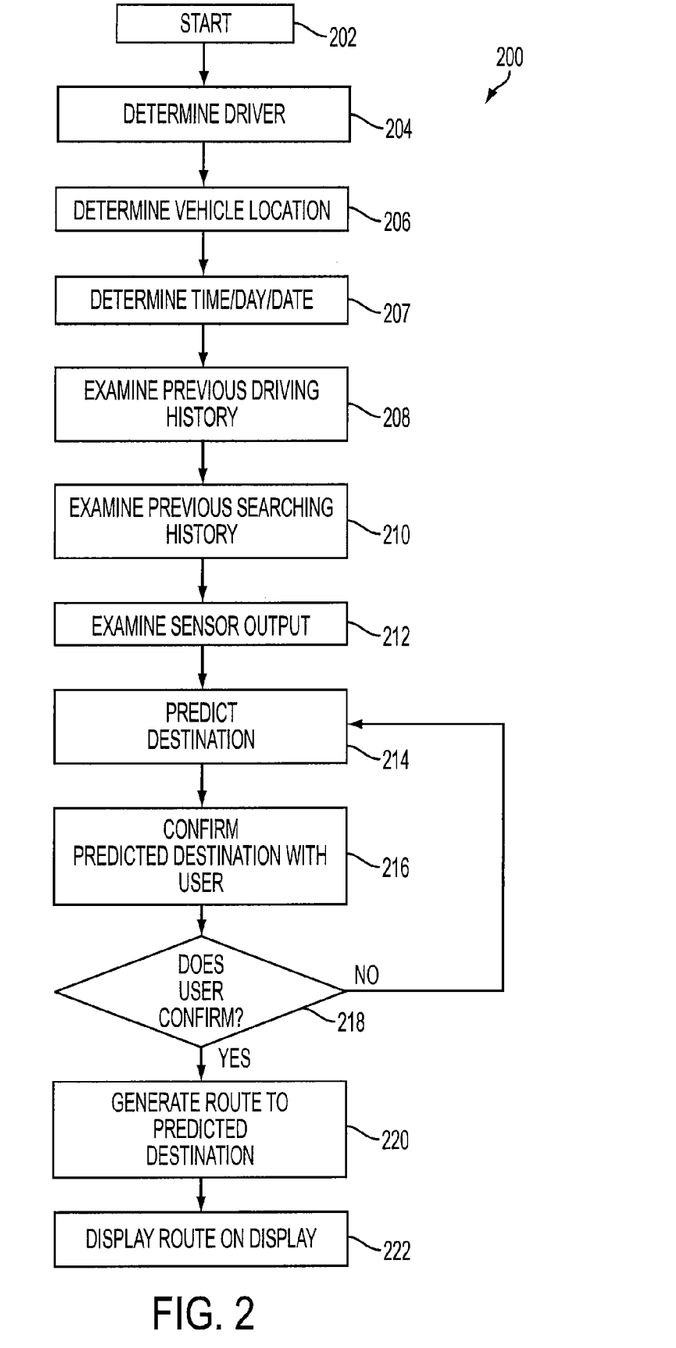
FIG. 2 is a flowchart for predictive destination entry using initial user confirmation according to an embodiment of the present invention.

Turning next to FIG. 2, a flowchart 200 showing one embodiment of predictive destination entry using initial user confirmation for a navigation system 120 is shown. The navigation system 120 may utilize a processor 122 for performing or processing all or some of the specific steps described herein. The processor 122 may be any type of hardware or circuit capable of performing the method steps described, for example, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In addition, the navigation system 120 may incorporate a memory 124 connected with the processor 122 or embedded as part of the processor 122. The memory 124 may be used for storing the various information or data used in the predictive process, as discussed below. For example, once the vehicle travels to one or more destinations or a user searches for one or more destinations, the navigation system 120 may store such destinations in a database in the memory 124. The database may be configured to store destination information the first time the vehicle travels there or the user searches for it. Alternatively, the database may only store information after a predetermined number of times the specific destination, or all combined destinations, are traveled to or searched for. The database may also save the number of times a particular destination was traveled to or searched for in order to further aid in the prediction process by more accurately capturing the driving habits of the vehicle or a particular user of the vehicle. This database may be accessed by the processor 122 for use in a prediction algorithm, as discussed in greater detail below.

In step 202, the method starts, such as when the vehicle is turned on or the navigation system 120 otherwise receives power from a battery of the vehicle. The method may also start after the vehicle is already turned on or the navigation system 120 has already received power, for example, when the user manually turns on or enables the navigation system 120 after the vehicle is already in operation. Alternatively, the method may also start when the user resets some portion of the navigation system 120 or otherwise places the navigation system 120 in a configuration to begin predictive destination analysis, even if the navigation system 120 had already been operating. This may be accomplished, for example, by pressing a destination button or control of the navigation system 120 to indicate that the user wishes to receive destination instructions.

In step 204, the navigation system 120 determines the user currently driving or preparing to drive the vehicle. This allows the navigation system 120 to more accurately predict a destination for the particular user operating the vehicle. Thus, the navigation system 120 is capable of tailoring its prediction towards a specific user of the vehicle and not only for the vehicle as a whole. This step accommodates the common situation where multiple individuals regularly drive a single vehicle. Indeed, families regularly share a vehicle among multiple members of that family, particularly when the cost of owning multiple vehicles is prohibitively high. By determining the user operating the vehicle, predictive destinations may be more accurate when compared against predictions only for the vehicle as a whole, but may require additional processing time or power.

In one embodiment, the navigation system may be configured to store a plurality of user profiles. Each user profile may correspond to a separate driver such that the navigation system may tailor its predictions toward a specific driver. The user profiles may originally be created or established manually by the user or users of the navigation system 120, such as by asking the user or users how many user profiles they would like to setup. Alternatively, the user profiles may be automatically created or generated based upon characteristics or settings of the vehicle. For example, the vehicle may include a plurality of saved position profiles for any of the driver seat, steering wheel, side-mirrors, etc. Thus, when a particular user enters the vehicle and/or selects a particular saved position profile, the driver seat, steering wheel, and/or side mirrors automatically adjust to their saved positions, thus configuring the driving experience to the physical dimensions and/or preferences of that particular user.

The navigation system 120 may interface with these characteristics or settings of the vehicle to establish a user profile corresponding to each of the saved position profiles. Thus, when a particular saved position profile is active in the vehicle, the navigation system 120 utilizes its corresponding user profile information to tailor the navigation predictions toward that particular user. In an alternative embodiment, the user profiles may correspond to other driver identification profiles or means. For example, instead of or in addition to the saved position profiles previously discussed, the vehicle may be configured to identify a driver based upon a particular key fob being used to operate the vehicle or being present within a predetermined vicinity of the vehicle. In another example, a driver's Bluetooth phone may be synced with one or more systems of the vehicle and may be used to identify and/or select a user profile of the navigation system 120. In still another example, a user profile of the navigation system 120 may be established for the valet key of the vehicle, such that the predictive destination system is disabled or otherwise configured if the valet key is used to operate the automobile. The user profiles may be stored in the memory 124 of the navigation system 120. Alternatively, the user profiles may be the same or stored as part of the saved position or other profiles for the vehicle, the navigation system 120 configured to reference the saved position or other profiles.

In step 206, the navigation system 120 determines a current location of the vehicle. This may be done by utilizing a positioning system, such as a GPS, to substantially pinpoint the longitude and latitude of the vehicle. In step 207, the navigation system 120 determines the current time, day and/or date. This may be done by interfacing with a different system onboard the vehicle (e.g., a clock or date system incorporated into the dash of the automobile) or the navigation system 120 may have its own internal time, day and/or date storage capabilities. By determining the vehicle location in step 206 and the current time, day and/or date in step 207, the navigation system 120 may more accurately predict a desired destination for the vehicle, as discussed in further detail below.

In step 208, the navigation system 120 examines the previous driving history of the vehicle. This driving history may include prior destinations to which the vehicle has traveled. These prior destinations may be stored in the memory 124 of the navigation system 120. For example, a user of the vehicle may regularly drive to a coffee shop at a specific time of the day (e.g., 7:30 am). The user may not have manually entered the coffee shop destination into the navigation system 120, but instead merely drove the vehicle to the coffee shop without referencing a generated travel route or set of travel instructions from the navigation system 120. Since the navigation system 120 has access to geographic data including roadways and various destination locations (e.g., restaurants, hotels, coffee shops, gas stations, etc.), the navigation system 120 need not have the specific address of the coffee shop manually input by the user of the vehicle in order to recognize the destination to which the vehicle has traveled. By examining the prior driving history stored in the memory 124, the navigation system 120 may utilize such data to make predictions regarding future destinations for the vehicle, as discussed in greater detail for step 214 below.

In step 210, the navigation system 120 examines a previous searching history of the user of the vehicle. The previous searching history may be stored in the memory 124 of the navigation system 120. In one example, the previous searching history may be prior destinations to which the user has entered the specific address into the navigation system 120 for obtaining a travel route or travel instructions to that address. In another example, the previous searching history may be search terms other than specific addresses (e.g., movie theaters, restaurant names, or other entertainment venues) that the user has input into the navigation system 120. The navigation system 120 may use these prior entered addresses and/or search terms to predict future vehicle destinations. The prior input destinations or search terms may be stored in the memory 124 and used for predicting future vehicle destinations, as discussed in greater detail for step 214 below, even if the vehicle never completes a travel route to those destinations.

In step 212, the navigation system 120 examines or otherwise responds to an output of a sensor that is coupled with the vehicle. The sensor may be configured to sense one or more settings or characteristics of the vehicle. In one embodiment, the vehicle setting or characteristic may be a fuel level of the vehicle. In a similar embodiment, the vehicle setting may be a battery charge level of the vehicle, for example in a hybrid or electric car that utilizes power sources other than purely gasoline combustion to provide power. In yet another embodiment, the vehicle setting or characteristic may be any other indication for the driving range of the vehicle. Thus, the signal or output from the sensor may be used for predicting future vehicle destinations, as discussed in greater detail for step 214 below.

In step 214, the navigation system 120 predicts the driver destination by processing data, information, and/or signals from one or more of the previous steps 204, 206, 207, 208, 210, and/or 212 via the processor 122 of the navigation system 120. The processor 122 may be configured to run one or more prediction algorithms using the data, information, and/or signals from the above-mentioned steps as inputs to the one or more prediction algorithms. Any one or all the steps mentioned above may be performed and that certain steps may be provided greater weight in the one or more prediction algorithms than others for determining a predicted destination.

The steps mentioned above may be performed in any order or omitted completely in alternative embodiments.

In one embodiment, the navigation system 120 may utilize the current time, day and/or date from step 207 in conjunction with the previous driving history of step 208 to predict a currently desired destination. Based upon this current time, day and/or date, the navigation system 120 may predict that the driver will desire to travel to a location identified in the previous driving history at the same or substantially the same time of day. Moreover, the navigation system 120 may evaluate the route against a current traffic map to determine the optimal route to that location in order to avoid traffic. The prediction may be based not only upon the current time of day, but also upon the current day of the week since travel habits for users may be different on weekdays when a user must travel to work versus weekends when a user may not have to travel to work. Similarly, the prediction may be based upon a particular date, such as a holiday, since a user may desire a particular destination on holidays (e.g., visiting a family member) that is not ordinarily traveled to during normal weekdays or weekends.

In another embodiment, the navigation system 120 may utilize the vehicle location from step 206 in conjunction with the previous searching history of step 208 to predict a currently desired destination. In one example, when the vehicle is located in a geographic location different from the vehicle's usual "home" location, the navigation system 120 may predict that the driver will desire to travel to a previously searched for destination near the current location of the vehicle, such as an amusement park or hotel. In another example, the navigation system 120 may determinate that a driver of the vehicle frequently searches for coffee shops at a particular time of the day and/or on a particular day of the week. By determining the time of the day and/or the day of the week and examining the previous searching history of the user of the vehicle in conjunction with the current vehicle location, the navigation system 120 may predict that the user will want to travel to a nearby coffee shop when the time of the day and/or the day of the week matches with the previously stored historical search data.

In yet another embodiment, the navigation system 120 may utilize the vehicle location from step 206 in conjunction with the sensor output of step 212 to predict a currently desired destination. For example, if the sensor outputs a signal representing a low fuel level, the navigation system 120 may predict that the user will want to locate a nearby gas station. The previous driving history from step 208 or the previous searching history from step 210 may additionally be used to determine user preferred gas stations if there are multiple gas stations in the nearby vicinity of the vehicle location. In a similar example, if the sensor outputs a low battery charge level for a vehicle, such as for a hybrid or electric car, the navigation system 120 may predict that the user will want to locate a nearby charging station or return home before the battery charge runs out. In yet another similar example, if the sensor outputs a signal indicating a driving range of the vehicle is at or is close to a predetermined number, the navigation system 120 may predict that the user wants to locate a fuel or power station in order to reset or extend the driving range.

As can readily be seen, a variety of potential prediction steps or algorithms may be employed utilizing any or all of the inputs previous described from steps 204, 206, 207, 208, 210, and/or 212, either alone or in conjunction with one another. The prediction algorithm may give greater weight in the prediction process to certain inputs depending upon the information provided by those inputs. For example, if the fuel level as determined by the sensor in step 212 is determined to be below a predetermined threshold, the prediction algorithm of the navigation system 120 may give the information or signal obtained in step 212 greater weight in the prediction process, encompassing the notion that a vehicle with a low fuel level will most likely seek travel to a nearby fuel station to fill up instead of traveling to another, less critical destination. If the fuel level as determined by the sensor in step 212 is not below the predetermined threshold, other inputs may also be examined in conjunction with the fuel level information to ensure that the navigation system 120 does not predict a destination for the vehicle that exceeds its drivable range.

A variety of prediction algorithms may be employed utilizing any one or more or all of the steps previously described. For example, the processor 122 may utilize the identified driver information (e.g., user profiles), as determined in step 204, and the previous driving history information, as determined in step 208, but not utilize current time, day and/or date information from step 207. Alternatively, the processor 122 may utilize the current time, day and/or date information, as determined in step 207, in conjunction with the previous searching history information, as determined in step 210, but not utilize the identified driver information from step 204. Any potential combination of the inputs may be used in the prediction process. Additional data or information may also be used in conjunction with the steps discussed above.

After one or more destinations have been predicted in step 214, operation continues to step 216 for confirmation by the user of the accuracy of the predicted destination or destinations. In one embodiment, a confirmation pop-up window may be shown on the display 102 of the navigation system 120, as discussed in greater detail for FIG. 3. For example, the popup window may display the address or title of the predicted destination with user-selectable YES/NO options for verifying that the user desires to travel to the predicted destination. In another example, instead of popping up a message, the display may provide a list to the user containing a number of the best predictions for the user to select amongst. In another embodiment, the confirmation may be obtained by any of a variety of confirmation or verification means. For example, the navigation system 120 may not utilize the display at all for confirmation, instead asking the user via audible commands what is preferred and awaiting a vocal response from the user via voice-recognition software.

According to step 218, if the user confirms a predicted destination of the navigation system 120, operation continues to step 220. If the user does not confirm a predicted destination of the navigation system 120, operation returns to step 214 for a new predicted destination to be determined. This newly predicted destination may be newly determined according to the prediction algorithm as previously described or the newly predicted destination may be the second best prediction already determined by the navigation system in step 214.

In step 220, the navigation system 120 generates a route to the predicted destination determined in step 214 and confirmed by the user in step 218. The starting point for this route may be the current location of the vehicle or may be any other location, for example, a specific address as set by the driver of the vehicle. In one embodiment, turn-by-turn instructions to the predicted destination may also be generated for presentation to the driver of the vehicle. In step 222, the generated route is displayed on the display 102 of the navigation system 120 for viewing by the driver of the vehicle. This may be accomplished by highlighting the various roadways of a map that make up the travel route. Turn-by-turn instructions may be displayed on the display 102 of the navigation system 120 via text instructions and/or may be spoken to the driver of the vehicle.

Figure 3:
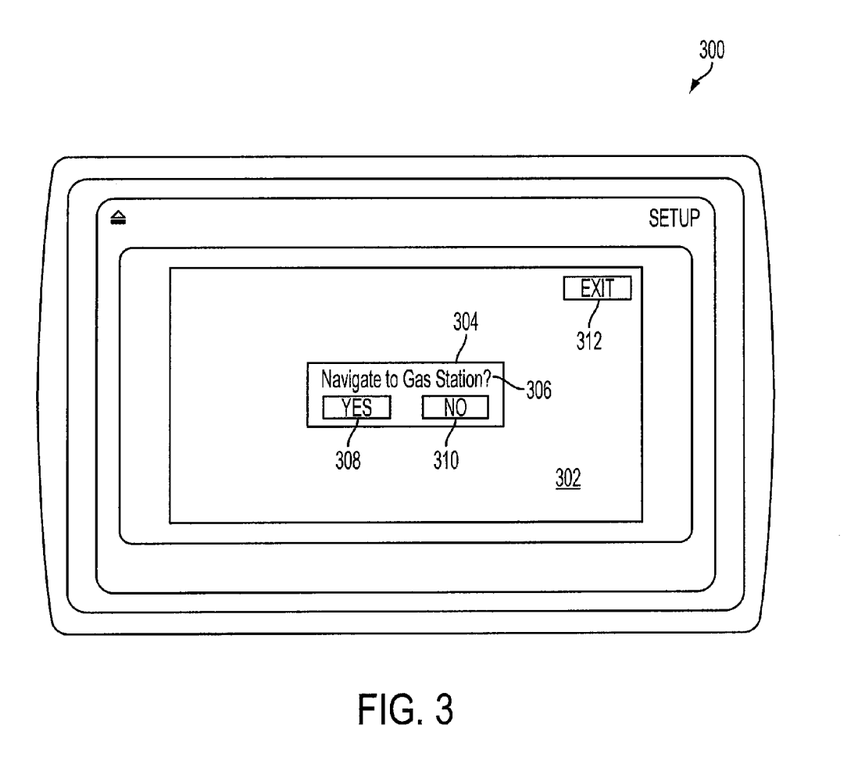
FIG. 3 is a zoomed-in front view of a screen of a navigation system using predictive destination entry with initial user confirmation functionality according to an embodiment of the present invention.

Turning next to FIG. 3, a zoomed-in front view 300 of a display 302 of the navigation system 120 using predictive destination entry with pop-up window functionality for user confirmation, is shown. As described above for FIG. 2 (see step 216), confirmation by the user of the accuracy of the predicted destination or destinations may be accomplished via a pop-up window 304 displayed to a user of the vehicle by the navigation system 120 before displaying the generated route or travel instructions to the user. The display 302 of the navigation system 120 may show to the user the pop-up window 304 containing the predicted destination information 306. The user may thus confirm, by selecting a positive selector 308, that the currently predicted destination of the navigation system 120 accurately describes their desired destination. After confirmation, the navigation system 120 may continue by generating a route to the predicted destination and/or displaying the route on the display, as discussed above for FIG. 2. Instead, if the user notices that the predicted destination information 306 does not match their desired destination, a negative selector 310 may be selected by the user. The navigation system 120 must then predict a new destination and confirm the new destination with the user. The user may also wish to cancel or exit out of the prediction process entirely, for example, by pressing an exit selector 312 that would halt the prediction process until restarted, for example, by any of the discussed illustrations in step 202 of FIG. 2.

Figure 4:
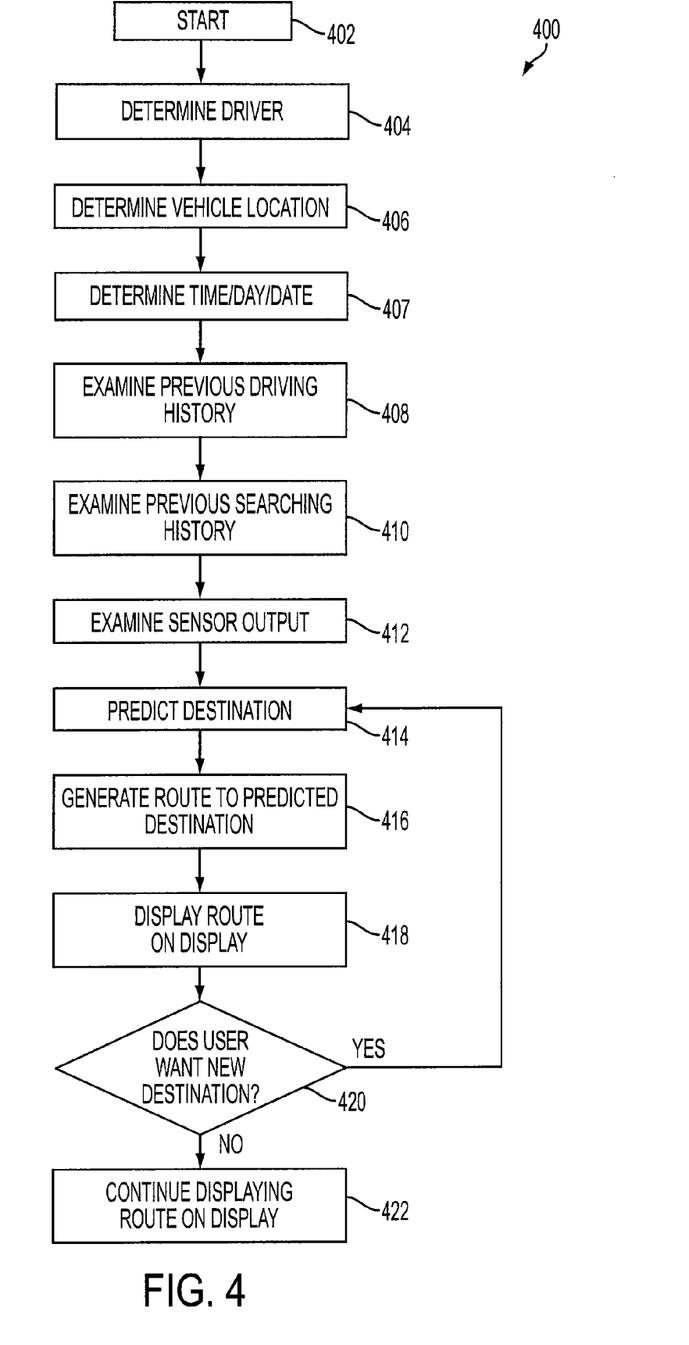
FIG. 4 is a flowchart for predictive destination entry using automatic routing according to an embodiment of the present invention.

Turning now to FIG. 4, with reference to FIG. 2, a flowchart 400 showing one embodiment of predictive destination entry using automatic routing for a navigation system is shown. Generally, the flowchart 400 may describe certain operational or functional features that are the same or similar to those described for the flowchart 200 described above for FIG. 2. Similarly, the flowchart 400 for a navigation system may be implemented by certain structural features, such as a processor for performing or processing all or some of the steps of the flowchart 400 and incorporate a memory for storing the various information or data used in the predictive process, the same or similar to those described for the flowchart 200 described above for FIG. 2. Notwithstanding these similar aspects, the flowchart 400 may be distinguished from the flowchart 200 based primarily on the automatic route generation of a predicted destination without first confirming the predicted destination with a user of the navigation system 120.

In step 402, the method starts, such as when the vehicle is turned on or the navigation system 120 otherwise receives power from a battery of the vehicle. The method may also start after the vehicle is already turned on or the navigation system 120 has already received power from the battery, for example, when the user manually turns on or enables the navigation system 120. Alternatively, the method may also start when the user resets some portion of the navigation system 120 or otherwise places the navigation system 120 in a configuration to begin predictive destination analysis, even if the navigation system 120 had already been operating, for example, by pressing a destination button or control of the navigation system 120 to indicate that the user wishes to receive destination instructions.

In step 404, the navigation system 120 determines the user currently driving or preparing to drive the vehicle, the same or similar to step 204. This may allow the navigation system 120 to more accurately predict a destination for a particular user operating the vehicle, for example through the establishment of particular user profiles corresponding to separate sets of data stored in the memory 124. In step 406, the navigation system 120 determines a current location of the vehicle, the same or similar to step 206 and in step 407, the navigation system 120 determines the current time, day and/or date, the same or similar to step 207.

Data or information regarding a previous driving history of the vehicle is examined in step 408, the same or similar to the discussion above for step 208. Similarly, data or information regarding a previous searching history of the user of the vehicle is examined in step 410, the same or similar to the discussion above for step 210. Likewise, in step 412, the navigation system 120 examines an output of a sensor that is coupled with the vehicle, the same or similar to the discussion above for step 212. The information, data, or other signals obtained from steps 404, 406, 407, 408, 410, and/or 412 may act as inputs to a prediction algorithm processed by the processor 122 of the navigation system 120 for predicting a destination for the vehicle in step 414. The processor 122 may be configured to run one or more prediction algorithms with the data, information, and/or signals from the above-mentioned steps as inputs to the one or more prediction algorithms. Any one or more or all the steps mentioned above may be performed and in any order and certain steps may be provided greater weight in the one or more prediction algorithms than others for determining a predicted destination, as previously described for step 214. A variety of potential prediction logic or algorithms may be employed utilizing any or all of the inputs previous described from steps 404, 406, 407, 408, 410, and/or 412, either alone or in conjunction with one another.

After one or more destinations have been predicted in step 414, operation continues in step 416 for automatic generation of a travel route to the predicted destination. The travel route may be generated from the current location of the vehicle, for example, as determined in step 406, to the predicted destination. Alternatively, the travel route may be generated from a specific starting address, for example, one defined or entered by the user or a default home address for the vehicle, to the predicted destination. In step 418, the generated travel route is automatically displayed on a display of the navigation system 120, for example, as discussed in greater detail for FIG. 5. This may be performed by highlighting one or more roadways or travel paths. In the alternative or in addition, turn-by-turn instructions may be provided to help guide a user follow the displayed travel route. These turn-by-turn instructions may be textual and displayed upon the display of the navigation system 120 and/or may be audible such that the navigation system 120 speaks to the user over a speaker connected to the navigation system 120.

In step 420, the user is asked whether they wish for the navigation system 120 to continue displaying and/or guiding the vehicle to the predicted destination or if a different destination is desired. This query may be presented as any type of selector that is selectable by the user, such as by manipulating a button, knob, touch screen location, or other control mechanism of the navigation system 120 so as to indicate that the generated and displayed route does not lead to a desired destination. Alternatively, the query may be audible in nature and await a spoken response from a user using voice recognition software. If the user indicates that they desire a different destination than the route currently displayed on the display, operation returns to step 414 for a new destination prediction to be made. If the user does not indicate a different destination is desired, the travel route currently on display per step 418 remains on the display 102 of the navigation system 120. In an alternative embodiment, the query may be presented as a list of predicted destinations such that the user may select amongst the predicted destinations. Upon selecting one of the predicted destinations, a travel route to that destination is generated and displayed on the display 102 of the navigation system 120.

Figure 5:
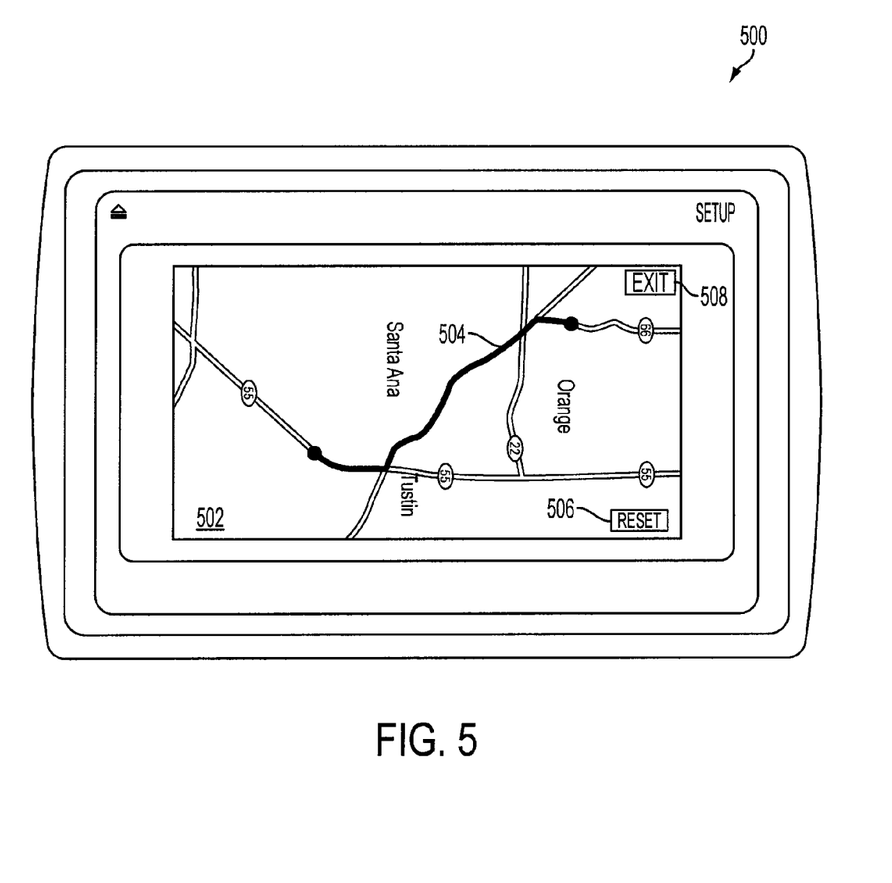
FIG. 5 is a zoomed-in front view of a screen of a navigation system using predictive destination entry with automatic routing functionality according to an embodiment of the present invention.

Turning next to FIG. 5, a zoomed-in front view 500 of a display 502 of a navigation system using predictive destination entry with automatic routing functionality is shown. As noted above for FIG. 4 (see step 418), a travel route 504 to a predicted destination may be displayed upon the display 502 in order to guide a user of the navigation system 120 to the predicted destination. The travel route 504 may comprise one or more highlighted roadways or travel paths in order to guide the vehicle either from a specified starting location or the current vehicle location to the predicted destination location. In addition to the travel route 504, other guiding instructions may be provided to the user, such as textual or audible turn-by-turn driving instructions.

The travel route 504 may be automatically generated and displayed upon the display 502 of the navigation system 120 after a predicted destination for the vehicle is determined, even without first querying the user for confirmation of the predicted destination. Such automatic operation may occur when the navigation system 120 is particularly confident concerning the predicted destination, for example, if the prior driving or searching habits of the user or vehicle exhibit a substantial driving trend. A substantial driving trend may be so established when the vehicle travels or the user searches a particular destination more than a predetermined number of times. In the event the automatic route generation and/or display does not accurately conform to the user desires, a reset selector 506 may be provided to allow the user to request a different predicted destination. The user may wish to cancel or exit out of the prediction process entirely, for example, by pressing an exit selector 508 that would halt the prediction process and/or route generation or display until restarted, for example, by any of the discussed illustrations in step 402 of FIG. 4.

Those of ordinary skill would appreciate that the various illustrative logical blocks, modules, and algorithm steps described in connection with the examples disclosed herein may be implemented as electronic hardware, computer software, or combinations of both. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A navigation system for a vehicle comprising:
    a first sensor configured to receive user profile data from a key fob or a wireless device, the user profile data corresponding to at least a prior driving history of the vehicle and a search term other than destination addresses to which the vehicle has previously traveled;
    a memory for storing the user profile data;
    a processor coupled with the memory, the processor configured to predict a destination for the vehicle based on the user profile data corresponding to the at least prior driving history and search term; and
    a display coupled with the processor, for displaying the predicted destination for the vehicle.

2. The navigation system of claim 1 wherein the processor is configured to predict the destination for the vehicle without requiring a user of the vehicle to manually input a portion of the destination.

3. The navigation system of claim 1 wherein the processor is configured to predict the destination based on a relationship between the search term and a current location of the vehicle.

4. The navigation system of claim 1 wherein the processor is configured to predict the destination based on a relationship between the search term and a current time, day, or date.

5. The navigation system of claim 1 further comprising a second sensor configured to sense a characteristic of the vehicle.

6. The navigation system of claim 5 wherein the characteristic of the vehicle sensed by the second sensor comprises a fuel level of the vehicle.

7. The navigation system of claim 5 wherein the characteristic of the vehicle sensed by the second sensor comprises a state of battery charge of the vehicle.

8. The navigation system of claim 5 wherein the characteristic of the vehicle sensed by the second sensor comprises a maximum driving range of the vehicle.

9. A method for predicting a destination for a vehicle, the method comprising the steps of:
    providing a navigation unit having a display, a processor coupled with the display, a memory coupled with the processor and a first sensor coupled with the memory;
    identifying, using the first sensor, a driver of the vehicle;
    storing, in the memory, prior driving history data of the driver;
    storing, in the memory, prior searching history data of the driver including a search term other than destination addresses to which the vehicle has previously traveled;
    determining a current location of the vehicle using the processor; and
    predicting a current destination for the vehicle using the processor based on the prior driving history data, the prior searching history data and the current location.

10. The method of claim 9 wherein the prior driving history data corresponds to at least a destination traveled to by the vehicle without being manually input by a user to the navigation unit.

11. The method of claim 9 wherein the prior driving history data corresponds to at least a destination manually input by a user to the navigation unit.

12. The method of claim 9 further comprising the step of determining a current time, day, or date, wherein the step of predicting the current destination for the vehicle is based on the current time, day, or date.

13. The method of claim 9 further comprising the step of displaying a message on the display of the navigation unit for confirming the predicted current destination for the vehicle by a user of the vehicle.

14. The method of claim 9 further comprising the step of automatically displaying a travel route from the current location of the vehicle to the predicted current destination on the display of the navigation unit.

15. A method for predicting a destination for a vehicle, the method comprising the steps of:
   providing a navigation system having a display, a processor coupled with the display, a memory coupled with the processor, a first sensor coupled with the processor, and a second sensor coupled with the processor;
   identifying, using the first sensor, a driver of the vehicle;
   storing, in the memory, prior driving history data of the driver;
   storing, in the memory, prior searching history data of the driver including a search term that is not an entry in the prior driving history data;
   determining a current location of the vehicle using the processor;
   sensing a characteristic of the vehicle using the second sensor; and
   predicting a current destination for the vehicle using the processor based on the prior driving history data, the prior searching history data and the characteristic of the vehicle sensed by the second sensor.

16. The method of claim 15 wherein the characteristic of the vehicle sensed by the second sensor is a driving range of the vehicle.

17. The method of claim 15 wherein the characteristic of the vehicle sensed by the second sensor is a fuel level or battery charge level of the vehicle.

18. The method of claim 15 further comprising the step of determining a current time, day, or date, wherein the step of predicting the current destination for the vehicle is based on the current time, day, or date.

19. The method of claim 15 further comprising the step of displaying a message on the display of the navigation system for confirming the predicted current destination for the vehicle by a user of the vehicle.

20. The method of claim 15 further comprising the step of automatically displaying a travel route from the current location of the vehicle to the predicted current destination on the display of the navigation system.

21. A navigation system for a vehicle comprising:
   a memory for storing prior driving history data, and for storing prior searching history data corresponding to at least a search term other than destination addresses to which the vehicle has previously traveled;
   a processor coupled with the memory and configured to predict a destination for the vehicle based on the prior driving history data and the prior searching history data; and
   a display coupled with the processor, for displaying the predicted destination for the vehicle.

22. The navigation system of claim 21 wherein the search term corresponds to a location to which the vehicle has not previously traveled.

23. The navigation system of claim 21 wherein the processor is configured to predict the destination based on a relationship between the search term and a current location of the vehicle.

24. The navigation system of claim 21 wherein the processor is configured to predict the destination based on a relationship between a time, day, or date associated with the search term and a current time, day, or date.

* * * * *

UNITED STATES PATENT AND TRADEMARK OFFICE
CERTIFICATE OF CORRECTION

| | |
|---|---|
| PATENT NO. | : 8,688,290 B2 |
| APPLICATION NO. | : 13/338139 |
| DATED | : April 1, 2014 |
| INVENTOR(S) | : Mark A. Jotanovic |

Page 1 of 1

It is certified that error appears in the above-identified patent and that said Letters Patent is hereby corrected as shown below:

On the title page:
The last name of inventor Mark A. Jotanovic was spelled incorrectly and should read as marked up below:

Item (12) Jotanovic
Item (75) Inventor: Mark A. Jotanovic, Troy, MI (US)

Signed and Sealed this
Fourth Day of November, 2014

Michelle K. Lee
*Deputy Director of the United States Patent and Trademark Office*